United States Patent [19]

Gardlund

[11] 4,319,003

[45] Mar. 9, 1982

[54] POLY(METHYL METHACRYLATE) POLYCARBONATE BLOCK COPOLYMERS

[75] Inventor: Zachariah G. Gardlund, Utica, Mich.

[73] Assignee: General Motors Corporation, Detroit, Mich.

[21] Appl. No.: 191,283

[22] Filed: Sep. 26, 1980

[51] Int. Cl.³ .............................................. C08G 81/02
[52] U.S. Cl. ..................................... 525/148; 525/468
[58] Field of Search ................. 525/148, 146, 464, 468

[56] References Cited

U.S. PATENT DOCUMENTS

| | | | |
|---|---|---|---|
| 3,462,515 | 8/1969 | Cantrill | 525/468 |
| 3,692,870 | 9/1972 | Schnell et al. | 525/468 |
| 4,107,386 | 8/1978 | Gruber et al. | 525/468 |
| 4,196,276 | 4/1980 | Schreckenberg et al. | 525/146 |

FOREIGN PATENT DOCUMENTS

| | | | |
|---|---|---|---|
| 965085 | 7/1964 | United Kingdom | 525/146 |
| 1182807 | 3/1970 | United Kingdom | 525/148 |

*Primary Examiner*—Wilbert J. Briggs, Sr.
*Attorney, Agent, or Firm*—Elizabeth F. Harasek

[57] ABSTRACT

Poly(methyl methacrylate) is modified to have improved impact resistance by forming an ABA-type block copolymer where the A segments are poly(methyl methacrylate) and the B segment is polycarbonate. The ABA block copolymer is moldable, transparent and has a number average molecular weight ($\overline{M}n$) in the range of from about 15,000 to 100,000.

5 Claims, No Drawings

POLY(METHYL METHACRYLATE) POLYCARBONATE BLOCK COPOLYMERS

BACKGROUND OF THE INVENTION

This invention relates to block copolymers of the ABA type wherein the A segments are poly(methyl methacrylate) and the B segments are polycarbonate. More particularly, the invention relates to such ABA copolymers having a number average molecular weight in the range from about 15,000 to 100,000 that are impact resistant, moldable, transparent and thermoplastic.

Poly(methyl methacrylate) (PMM) is used to mold automotive lenses because it is clear, abrasion resistant, has moderate tensile strength, is stable to UV radiation, and is easily injection moldable. However, poly(methyl methacrylate) has virtually no yield strength and is prone to impact breakage. It also has a relatively low distortion temperature that may be incompatible with the high output light bulbs used in compact lens designs.

Polycarbonate (PC) is also a clear thermoplastic used in lens molding. It has higher yield strength and impact resistance than PMM and a higher distortion temperature. However, PC is more expensive and difficult to mold.

It would be desirable to combine the best properties of PMM and PC in a single molding composition. I have found that merely blending poly(methyl methacrylate) and polycarbonate resins does not yield a mixture having the advantageous properties of either. Moreover, the blends are opaque rather than clear.

It is therefore an object of the invention to provide an impact resistant, injection moldable polymer containing both poly(methyl methacrylate) and polycarbonate. A more particular object is to provide a novel ABA type block copolymer wherein the A segments are poly(metyl methacrylate) and the B segment is polycarbonate. Another particular object is to provide such ABA type block copolymers wherein the molecular weight of the polymer segments is predetermined and in the range of 500 to 35,000 to yield a block copolymer having a number average molecular weight in the range of about 15,000 to 100,000.

Another object of the invention is to provide a method of making such block copolymers by reacting together linear polycarbonate B-segments having chemically functional groups at both ends with linear poly(methyl methacrylate) A-segments having a functional group at one end that is reactive with PC end groups to yield ABA type block copolymers. A more particular object is to react linear polycarbonate, terminated at both ends with —OH groups, with poly(methyl methacrylate), terminated at one end with a chloroformate group, to yield an ABA block copolymer with polycarbonate linkages between blocks. A more specific object of the invention is to provide a method of making such ABA poly(methyl methacrylate)-polycarbonate block copolymers where the molecular weights of the A and B segments can be controlled to yield block copolymers having desired physical properties.

BRIEF SUMMARY OF THE INVENTION

In accordance with the invention, these and other objects are obtained by reacting together linear polycarbonate having functional groups at both ends with poly(methyl methacrylate) having a functional group at one end that is reactive with the functional end groups of the polycarbonate.

In a preferred embodiment, linear polycarbonate having a number average molecular weight in the range of from about 500 to 30,000 and a hydroxyl group at both ends is reacted with a stoichiometric excess of linear poly(methyl methacrylate) having a number average molecular weight in the range of 500 to 35,000 and a functional chloroformate group at one end. The number average molecular weights of the prepolymer constituents are chosen such that the resulting ABA (PMM-PC-PMM) type block copolymer has a number average molecular weight in the range of from about 15,000 to 100,000.

The impact resistance of a polymer is known to correlate with its tensile strength at yield. Poly(methyl methacrylate) homopolymer had no yield strength as measured in accordance with ASTM D882-75B Block copolymers of poly(methyl methacrylate) and polycarbonate made as above all exhibited positive yield strengths. Unexpectedly, the block copolymers were found to have higher yield strengths than polycarbonate homopolymer of like character, yet noneof the advantageous properties of the poly(methyl methacrylate) was diminished.

DETAILED DESCRIPTION OF THE INVENTION

The following specific examples will further point out the benefits and advantages of the subject ABA type block copolymers and set forth a preferred method of making them.

SYNTHESIS OF DIHYDROXY TERMINATED Poly(4,4'-isopropyliene diphenylene carbonate)

100 grams of dry bisphenol−A (0.438 mole) and 1 liter of dry pyridine were placed in a 2 liter Morton flask fitted with mechanical stirrer, inert gas and phosgene inlets, thermometer, cold finger condenser, and gas outlet with bubbler. A dry ice/acetone mixture was used in the condenser and the solution was maintained at 15°–20° C. by an external ice bath. Phosgene was bubbled through the solution at a fast rate with high speed stirring. The reaction was terminated by precipitation into water when a desired viscosity corresponding to a number average molecular polymer weight of 500 to 30,000 was reached. Terminating the polymerization reaction with water provides a hydroxyl group on both ends of the polycarbonate chain, herein referred to as dihydroxy terminated polycarbonate, polycarbonate diol, or HO—PC—OH. The white polymer was washed several times with hot water in a Waring blender and finally with methanol before drying in a vacuum oven.

Table I gives data for a number of poly(4,4'-isopropylidene diphenylene carbonate) diol syntheses including the number average molecular weights ($\overline{M}n$) of the samples as determined by vapor phase osmometry (VPO) in dichloroethane and gel permeation chromatography (GPC) in tetrahydrofuran and the weight average molecular weight ($\overline{M}w$) from GPC in tetrahydrofuran. The deviation between the listed molecular weights for a particular sample is a function of the method used to make the weight determination.

While the preparation of dihydroxy terminated polycarbonate has been described in terms of the phosgenation of bisphenol-A, other dihydroxy terminated carbonate resins prepared by other means would also be suitable for the practice of the invention. One form of my invention lies in the incorporation of polycarbonate diols in the 500 to 30,000 $\overline{M}n$ weight range in between two chloroformate terminated poly(methyl methacrylate) segments in an ABA-type block copolymer.

TABLE I

| DIHYDROXY TERMINATED POLYCARBONATE | | | |
|---|---|---|---|
| HO—PC—OH | $\overline{M}n^a$ | $\overline{M}n^b$ | $\overline{M}w^c$ |
| 1 | 1500 | 1450 | — |
| 2 | 12500 | 17600 | 55900 |
| 3 | 6000 | 6900 | 23300 |
| 4 | 2900 | 3100 | 11500 |
| 5 | 2200 | 2000 | 23900 |
| 6 | 3300 | 3800 | 24900 |
| 7 | 16300 | 27600 | 155400 |
| 8 | 12500 | 28900 | 120200 |
| 9 | 10150 | 27000 | 189100 |
| 10 | 12000 | — | — |
| 11 | 6600 | 8800 | 25000 |
| 12 | 1900 | 2100 | 4200 |
| 13 | 1900 | 2200 | 2700 |
| 14 | 3600 | 4600 | 16700 |
| 15 | 7400 | 10600 | 57100 |
| 16 | 8600 | 19600 | 61700 |

$^a\overline{M}n$ from VPO in dicloroethane.
$^b\overline{M}n$ from GPC in tetrahydrofuran.
$^c\overline{M}w$ from GPC in tetrahydrofuran.

SYNTHESIS OF MONOHYDROXY TERMINATED POLY (METHYL METHACRYLATE)

Inhibitor free methyl methacrylate monomer was placed in a round bottom flask fitted with a high vacuum stopcock. A very small amount, preferably 0.02 to 0.03 weight percent of the monomer weight, of azobisisobutyronitrile (AIBN) initiator was added. Any other suitable initiator could be used in like amount. From about 0.5 to 5.00 weight percent based on the monomer weight of the chain transfer agent 2-mercaptoethanol was added. Suitable chain transfer agents for the invention are those having a functional hydroxyl group at one end and a functional group at the other end capable of forming a free radical initiator by radical transfer from another molecule. Polymerization of the methyl methacrylate monomer is initiated by the AIBN. Since there is only a small amount of AIBN present, the principal reaction mechanism is the addition polymerization of the monomer onto the free radical mercapto end of the 2-mercaptoethanol transfer agent. The polymerization terminates by disproportionation. This yields poly(methyl methacrylate) polymers with a hydroxyl group at one end, herein referred to as monohydroxy terminated poly(methyl methacrylate) or PMM—OH. Suitable transfer agents are, gamma mercapto alcohols, e.g., 2-mercaptoethanol.

The mixture was subjected to three freeze-thaw cycles with a vacuum of $5 \times 10^{-2}$ Torr to remove any dissolved oxygen. The solution was then heated to 60° C. and retained at that temperature for 18 to 48 hours depending on the desired molecular weight for the polymerization product. Polymerization was terminated when a desired polymer $\overline{M}n$ weight in the range of 500 to 35,000 was reached by cooling the mixture to room temperature and diluting it to twice its volume with acetone and a small amount of hydroquinone. Excess monomer, and acetone were removed by means of a rotary evaporator. The polymer product was purified by repetitive dissolutions in acetone followed by successive precipitations into water and hexane. The polymer was dried at 80° C. under vacuum.

Table II lists the number average and weight average molecular weights of several PMM—OH samples prepared from methyl methacrylate monomers using the indicated amounts of 2-mercaptoethanol transfer agent and AIBN initiator.

TABLE II

| MONOHYDROXY TERMINATED POLY(METHYL METHACRYLATES) | | | | | |
|---|---|---|---|---|---|
| PMM—OH | HOCH$_2$CH$_2$SH w/o | AIBN w/o | $\overline{M}n^a$ | $\overline{M}n^b$ | $\overline{M}w^c$ |
| 1 | 1.25 | 0.02 | 8400 | 10400 | 27600 |
| 2 | 1.25 | 0.02 | 6300 | 5000 | 10300 |
| 3 | 1.00 | 0.02 | 8800 | 7600 | 14400 |
| 4 | 0.75 | 0.02 | 12300 | 12300 | 44600 |
| 5 | 1.25 | 0.01 | 8300 | 6100 | 12600 |
| 6 | 1.25 | 0.02 | 8100 | 7600 | 11400 |
| 7 | 1.25 | 0.02 | 9700 | 7200 | 12300 |
| 8 | 1.25 | 0.03 | 8300 | 10100 | 24800 |
| 9 | 1.50 | 0.03 | 7700 | 7600 | 18000 |
| 10 | 2.25 | 0.02 | 4100 | 3500 | 10200 |
| 11 | 1.50 | 0.03 | 6900 | 8000 | 22900 |
| 12 | 1.25 | 0.03 | 7200 | 7700 | 21300 |
| 13 | 1.25 | 0.03 | 6900 | 8200 | 24200 |
| 14 | 0.75 | 0.03 | 14400 | 12800 | 38200 |
| 15 | 0.15 | 0.03 | — | 22400 | 62200 |
| 16 | 0.50 | 0.02 | — | 24700 | 64300 |
| 17 | 0.75 | 0.02 | 13000 | 13400 | 42700 |
| 18 | 0.50 | 0.02 | — | 28400 | 64800 |
| 19 | 3.00 | 0.02 | 3000 | — | — |

$^a\overline{M}n$ by VPO in dichloroethane.
$^b\overline{M}n$ by GPC in tetrahydrofuran.
$^c\overline{M}w$ by GPC in tetrahydrofuran.

The method of preparing the monohydroxy terminated PMM is not critical to my invention. Any other method which yields a like product in the preferred $\overline{M}n$ weight range of 500 to 35,000 would be acceptable.

SYNTHESIS OF MONOCHLOROFORMATE TERMINATED POLY(METHYL METHACRYLATE)

The terminal hydroxy groups at the ends of the poly(methyl methacrylate) polymers prepared as above were converted to chloroformate groups for direct reaction with the dihydroxy terminated polycarbonate. In a preferred reaction, 59 grams (0.6 mole) dry phosgene was distilled into an oven dried 2 L Morton flask fitted with mechanical stirrer, thermometer, cold finger condenser and gas bubbler. The cold finger contained a dry ice/acetone slurry and the Morton flask was set in an ice water bath. A clear solution of hydroxy terminated poly (methyl methacrylate) prepared as above (180 g, 0.01 mole, dried in a vacuum desiccator for 48 hr @5·10$^{-2}$ Torr and 50°–60° C.) in dry benzene (500 ml) was added during 1.5 hour to the rapidly stirred phosgene at 5°–10° C. After the polymer solution was all added, the reaction was rapidly stirred at room temperature for 2 hours, then 1 to 2 hours at 55° to 60° C., and overnight at room temperature. Excess phosgene was removed by entrainment in a stream of inert gas and was destroyed by bubbling through aqueous sodium hydroxide solutions in gas towers. The polymer solution was transferred to a single neck round bottom flask and the benzene with traces of phosgene was removed by vacuum distillation at room temperature into a large trap cooled by liquid nitrogen. The solid mass of chloroformate terminated poly(methyl methacrylate) was dissolved in dry 1,2-dichloroethane for use directly in reaction with polycarbonate.

EXAMPLE I

Emulsion Formation of ABA Block Copolymer 10.8 grams dihydroxy terminated polycarbonate ($\overline{M}_n \simeq 18,180$; $5.9 \times 10^{-4}$ moles), prepared as set forth above, was dissolved in 100 ml 1,2-dichloroethane. The solution was contained in a 1 liter Morton flask fitted with a mechanical stirrer, thermometer, and 250 ml addition funnel. A cold solution of 8 grams of sodium hydroxide in 100 ml water was added. It is believed that the NaOH pulls a hydrogen ion from the hydroxy groups on the polycarbonate to promote their reaction with the terminal chloroformate of the poly(methyl methacrylate). 20 drops of N,N'-dibutylamine were added to catalyze the reaction.

The mixture was cooled to 5° C. and a solution of 90 grams monochloroformate terminated PMM ($M_n \sim 22,500$; $40 \times 10^{-4}$ moles) dissolved in 400 ml 1,2-dichloroethane was added dropwise during one hour. Because the PC is difunctional and the PMM monofunctional, at least a 2:1 mole ratio of PMM:PC is required to form the subject ABA[PMM-PC-PMM] block copolymers. I have found that the reaction yield is greatly improved when a large molar excess, preferably greater than 5:1, of monochloroformate is employed.

The emulsion thus formed immediately changed from white to bright yellow and then back to white during the 6 hour reaction time. The polymerization was terminated by the addition of a solution of 15 ml glacial acetic acid and 50 ml 1,2-dichloroethane. The mixture was precipitated in a 10:1 volume of methanol and washed three times with water. Unreacted PMM was extracted from the product with acetone. I have not discovered a method of removing unreacted PC, however, the good physical properties of the product strongly suggest that only a small amount of PC homopolymer is present.

A list of ABA block copolymers thus prepared is set out in Table III with an E-designation preceding the sample number. The mole amounts of PMM-OCOCl and HO-PC-OH reactants are listed; as well as the reaction solvents, time, and temperatures. The theoretical molecular weights of the products based on a 2:1 mole ratio of PMM to PC are listed next to the number average molecular weights ($\overline{M}_n$) of the samples determined by gel permeation chromatography. The reaction yield as a percent of the weight of the reactants is listed in the last column.

TABLE III

BLOCK COPOLYMERS BASED ON POLY(METHYL METHACRYLATE) CHLOROFORMATE

| ABA[a] Polymer Number | —OCOCl (No.) | —OCOCl ($10^{-3}$ mole) | HO—PC—OH (No.) | HO—PC—OH ($10^{-3}$ mole) | Solvent[b] | Time (hr) | Temp. (°C.) | Molecular Weight Theoretical | Molecular Weight GPC | Yield (%) |
|---|---|---|---|---|---|---|---|---|---|---|
| E1  | 9  | 2.0 | 3  | 0.8  | B, DCE | 4   | 10 | 22100 | 21800 | 34 |
| E2  | 9  | 2.2 | 3  | 0.8  | B, DCE | 4   | 10 | 22100 | 19100 | 40 |
| E3  | 10 | 4.3 | 3  | 0.39 | B, DCM | 4   | 10 | 13900 | 16300 | 28 |
| E4  | 9  | 2.2 | 3  | 0.39 | B, DCM | 4   | 15 | 22100 | 19000 | 41 |
| E5  | 6  | 2.0 | 2  | 0.36 | B, DCM | 6   | 10 | 32800 | 32500 | 60 |
| E6  | 6  | 4.5 | 3  | 1.6  | B, DCE | 1[c]| 10 | 22100 | 16400 | 44 |
| E7  | 6  | 4.5 | 3  | 1.6  | B, DCE | 4[c]| 15 | 22100 | 17300 | 33 |
| E8  | 6  | 4.5 | 3  | 1.6  | B, DCE | 8[c]| 15 | 22100 | 17200 | 23 |
| E9  | 8  | 1.8 | 1  | 1.0  | B, DCM | 6   | 10 | 21700 | 18800 | 70 |
| E10 | 8  | 1.8 | 11 | 0.74 | B, DCM | 1   | 5  | 29000 | 18100 | 30 |
| E11 | 8  | 8.0 | 11 | 1.8  | DCE    | 4   | 10 | 29000 | 30900 | 78 |
| S12 | 8  | 8.0 | 11 | 1.8  | DCE    | 4   | 10 | 29000 | 23600 | 46 |
| E13 | 12 | 13  | 9  | 1.1  | DCE    | 4   | 10 | 42400 | 46000 | 82 |
| E14 | 12 | 14  | 14 | 2.3  | DCE    | 4   | 10 | 20000 | 27000 | 77 |
| E15 | 15 | 4   | 16 | 0.55 | DCE    | 4   | 50 | 64400 | 70000 | 56 |
| S16 | 15 | 4   | 16 | 0.55 | DCE    | 4   | 50 | 64400 | 40100 | 62 |

[a] E-designated samples were polymerized in emulsion. S-designated samples were polymerized in solution.
[b] B (benzene), DCE (1,2-dichloroethane), DCM (dichloromethane).
[c] Reaction run in Waring blender jar.
[d] Tributylamine catalyst.
[e] Reaction run in solution with pyridine as catalyst.
[f] Reaction run in solution wth pyridine and dibutylamine as catalysts.

EXAMPLE II

Solution Formation of ABA Block Copolymers 10.8 grams of dry dihydroxy terminated polycarbonate ($\overline{M}_n \sim 18,180$; $5.9 \cdot 10^{-4}$ mole) was dissolved in 100 ml dry 1,2-dichloroethane contained in an oven dried 1 liter Morton flask fitted with mechanical stirrer, thermometer and 250 ml addition funnel. Dry pyridine (0.8 ml, $1 \cdot 10^{-2}$ mole) and dry N,N-dibutylamine (0.4 ml, $1 \cdot 10^{-2}$ mole) were added. Monochloroformate terminated poly(methyl methacrylate) (90 g, $4 \cdot 10^{-3}$ mole), prepared as above, was dissolved in 400 ml dry 1,2-dichloroethane and added dropwise with stirring at 0°–5° C. during one hour. The reaction was allowed to warm to room temperature and stirring was continued for 4 hours at 50° C. The polymerization was terminated by precipitation into methanol (10:1). The polymer was washed three times with methanol, air dried, and the unreacted PMM extracted with acetone. The ABA block copolymers thus prepared are listed with an S-designation in Table III.

Properties of ABA Block Copolymers

Solutions of polycarbonate homopolymer (Lexan ® marketed by General Electric); poly(methyl methacrylate) homopolymer (Plexiglas ® V811 marketed by Rohm and Haas); mixtures of the homopolymers; and several block copolymers formed as in Examples I and II were made up at 20 weight percent in 1,2-dichloroethane for film casting. The block copolymer solutions were clear, colorless, and did not separate into two distinct layers on standing as did solutions of poly(methyl methacrylate) and polycarbonate homopolymer. The block copolymer films were also clear and colorless whereas the films of the blends were cloudy to opaque. All films were air dried, heated in a vacuum oven overnight at 60° C., and finally for 1 to 2 hours at 160° C. to remove traces of solvent. The films were each cut into several strips and their mechanical properties were determined in accordance with standard ASTM procedures. The mechanical properties of a number of block copolymers are listed in Table IV along with the properties of poly(methyl methacrylate) homopolymer ($\overline{M}n \sim 75{,}000$), polycarbonate ($\overline{M}n \sim 35{,}000$), homopolymer and 0.25, 0.50 and 0.75 mole fraction PC:PMM polymer blends. In addition to not being transparent, the poly(methyl methacrylate)-polycarbonate physical blend films did not yield. The polycarbonate film had a tensile strength at yield of 53 MPa and an elongation of 6 percent. All of the block copolymers had yield strengths in the range of (or superior to) polycarbonate film and much superior to poly(methyl methacrylate). Thus the improvement in yield strength of PMM provided by incorporating a PC segment in between two PMM polymer segments appears to be synergistic.

TABLE IV

POLYMER FILM MECHANICAL PROPERTIES

| Polymer | Mole Fraction Polycarbonate | Tensile[a] Modulus (GPa) | Tensile Strength[a] Yield (MPa) | Tensile Strength[a] Break (MPa) | Elongation[a] Yield (%) | Elongation[a] Break (%) |
|---|---|---|---|---|---|---|
| E5 | 0.61 | 1.4 | 71 | 64 | 9 | 14 |
| E11 | 0.57 | 1.3 | 50 | 44 | 6 | 14 |
| E13 | 0.68 | 1.5 | 75 | 74 | 10 | 12 |
| E15 | 0.48 | 1.3 | 65 | 66 | 7 | 8 |
| PMMA | 0.00 | 3.6 | No Yield | 135 | No Yield | 5 |
| 25% PC | 0.25 | 2.7 | No Yield | 120 | No Yield | 6 |
| 50% PC | 0.50 | 1.2 | No Yield | 60 | No Yield | 7 |
| 75% PC | 0.75 | 2.4 | No Yield | 120 | No Yield | 7 |
| PC | 1.00 | 1.1 | 53 | 51 | 6 | 7 |

[a]ASTM D882-75B

We believe that the procedures set forth in the examples above produce block copolymers of the ABA-type where the A segments are poly(methyl methacrylate) and the B segment is polycarbonate, the A and B segments being joined by carbonate linkages. The preferred molecular weight range ($\overline{M}n$) for the PMM prepolymer is from about 500 to 35,000 and for the PC prepolymer about 500 to 30,000. The preferred weight range ($\overline{M}n$) for the ABA block copolymers is from about 15,000 to 100,000.

Because the ABA block copolymers of my invention are linear in nature, they are well suited to injection molding. Moreover, just enough of the relatively more expensive polycarbonate resin need be included to provide brittle and unyielding poly(methyl methacrylate) with the desired impact resistance preferably greater than 5 percent elongation at yield. The invention further provides a means of creating a block polymer of a desired end weight preferably less than 100,000 ($\overline{M}n$), wherein the molecular weight of the block segments is controlled by choosing suitable starting materials.

While the method set forth above represents my best mode of practicing the invention, other methods may be used to form such block copolymers. For example, a stoichiometric excess of monocarboxy terminated poly(methyl methacrylates) may be reacted in solution with a preformed hydroxy terminated polycarbonate in the presence of phosgene gas. This reaction results in PMM-PC-PMM block copolymers with ester linkages between the blocks.

In another possible reaction mechanism, a stoichiometric excess of monoacidchloride terminated poly(methyl methacrylate) could be reacted with dihydroxy terminated polycarbonates in a suitable solvent in the presence of an amine catalyst to form block copolymers with the segments joined by polyester linkages.

While my invention has been described in terms of specific embodiments thereof, other forms could be readily adapted by one skilled in the art. Therefore my invention is limited only by the following claims.

The embodiments of the invention in which an exclusive property or privilege is claimed are defined as follows:

1. An impact resistant, moldable, transparent, thermoplastic block copolymer of the ABA type wherein the A segments are poly(methyl methacrylate) having a number average molecular weight ($\overline{M}n$) in the range of from about 500 to 35,000 and the B segment is polycarbonate having a number average molecular weight ($\overline{M}n$) in the range of from about 500 to 30,000 said block copolymer having a number average molecular weight ($\overline{M}n$) in the range of from about 15,000 to 100,000.

2. A transparent, colorless, thermoplastic block copolymer of the ABA type having a number average molecular weight ($\overline{M}n$) in the range of from about 15,000 to 100,000 which is the reaction product of linear A segments of poly(methyl methacrylate) having a number average molecular weight ($\overline{M}n$) in the range of from about 500 to 35,000 and a chloroformate group at one end, and linear B segments of polycarbonate terminated at both ends with a functional hydroxyl group, said B segments having a number average molecular weight ($\overline{M}n$) in the range of from about 500 to 30,000.

3. A transparent, impact resistant, injection moldable block copolymer of the ABA-type where the A segments are poly(methyl methacrylate) and the B segment is polycarbonate, said block copolymer having a number average molecular weight ($\overline{M}n$) of less than about 100,000 and an elongation at yield greater than 5% as determined by ASTM D882-75B.

4. A transparent moldable impact resistant block copolymer of the ABA-type wherein the B block is polycarbonate having a number average molecular weight of from about 500 to 30,000 and wherein the A blocks are poly(methyl methacrylate) segments of substantially similar chain length, said segments having a number average molecular weight ($\overline{M}n$) in the range of from about 500 to 35,000, the block copolymer having a number average molecular weight ($\overline{M}n$) in the range of from about 15,000 to 100,000.

5. A transparent, method of making impact resistant, colorless, transparent, thermoplastic polymers comprising reacting linear polycarbonate terminated at both ends with hydroxy groups having a number average molecular weight ($\overline{M}n$) in the range of from about 500 to 30,000 with an amount of linear poly (methyl methacrylate) having a number average molecular weight ($\overline{M}n$) in the range of from about 500 to 35,000 and a functional chloroformate group at one end sufficient to combine with said hydroxyl groups to thereby yield an ABA type block copolymer having a number average molecular weight ($\overline{M}n$) in the range of from about 15,000 to 100,000 where the A segments are poly(methyl methacrylate) and the B segments are polycarbonate.

* * * * *